Feb. 5, 1929.
C. R. SHORT
MOTOR MOUNTING
Filed April 8, 1927
1,701,394
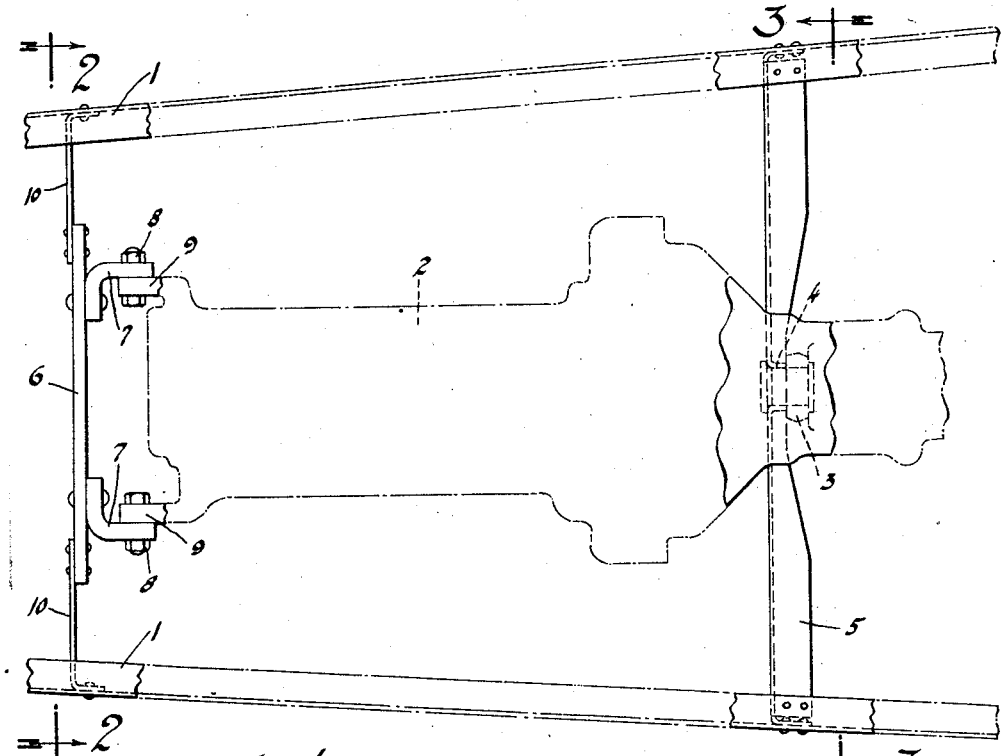
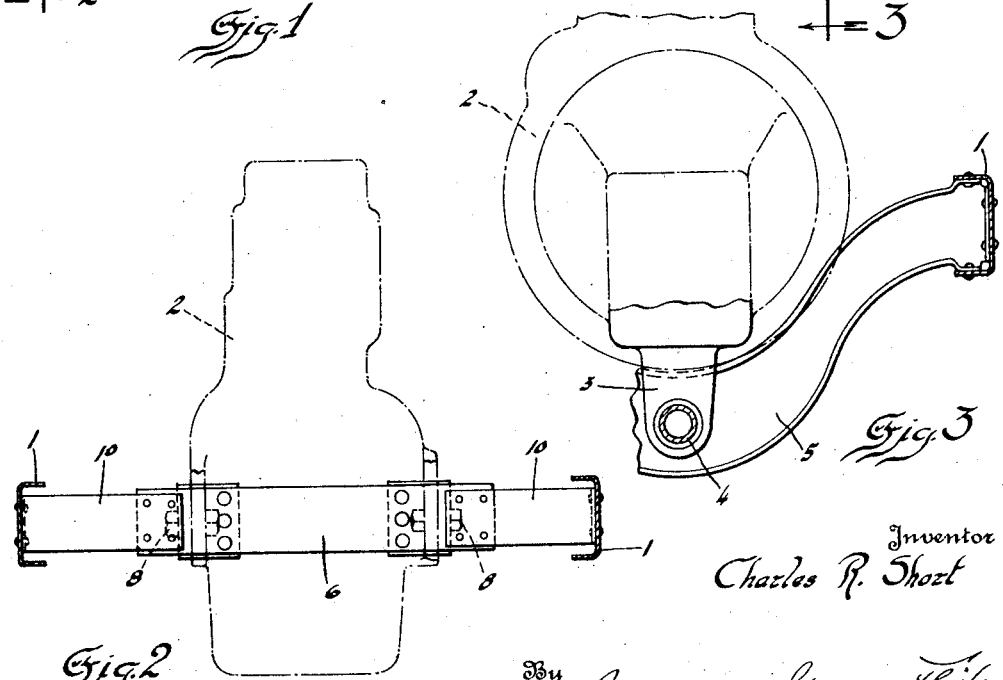
Inventor
Charles R. Short
By Blackmore, Spencer & Hull
Attorneys Patented Feb. 5, 1929.

1,701,394

UNITED STATES PATENT OFFICE.

CHARLES R. SHORT, OF DETROIT, MICHIGAN, ASSIGNOR TO GENERAL MOTORS RESEARCH CORPORATION, OF DETROIT, MICHIGAN, A CORPORATION OF DELAWARE.

MOTOR MOUNTING.

Application filed April 8, 1927. Serial No. 182,025.

This invention relates to motor vehicles and more particularly to resilient engine mountings, which are adapted to cushion or absorb engine vibrations and the like.

Engine vibrations are especially pronounced with internal combustion engines of the four cylinder type, due to the fact that the reciprocation of the several pistons concurrently increases and decreases in acceleration as they proceed in pairs toward opposite limits of their respective strokes. Since the weight of the flywheel and transmission gearing brings the center of gravity rearwardly of a medial point between the group of cylinders, the reactions are particularly manifested at the front of the engine. These inherent unbalanced forces result in a high frequency vibration of the engine block throughout an amplitude of a few thousandths of an inch and, unless dampened, are transmitted throughout the entire chassis frame and body, causing other parts to come into resonance and sympathetic vibration, setting up disagreeable noises and rattles, as well as resulting in undue wear and breakage of parts and being highly unpleasant to nervous systems of passengers.

The primary object of the present invention is to provide a novel arrangement for mounting the engine so as to eliminate transmission of such reactions, and to this end, contemplates a support for the rear of the engine at or adjacent the neutral point of vibration, and a resilient support for the front of the engine, comprising pivotal connections with a pair of rearwardly extending arms on a transverse cross bar that is capable of being twisted torsionally to accommodate the up and down movement of the engine block, whereby the chassis frame is freed of vibratory strains. At the same time, the flexibility of the mounting obviates the effects on the engine of frame weaving, such as occurs when uneven roadways are being negotiated.

Other objects and advantages will be apparent from the following specification of a preferred embodiment of the invention, taken in connection with the accompanying drawing, wherein Figure 1 is a top plan view of an engine mounted in a chassis frame in accordance with the present invention; and Figures 2 and 3 are front and rear elevations on lines 2—2 and 3—3 respectively of Figure 1.

Referring more specifically to the drawing, the reference characters 1—1 indicate a pair of longitudinally extending channelled side members of an automobile chassis frame, and 2 the power plant, consisting of a multi-cylinder internal combustion engine. The preferred arrangement for mounting an engine in its frame is to employ three points of suspension, and in the present case, a single suspension point is provided at the rear of the engine, by means of a dependent lug or ear 3 on the transmission casing, at approximately the point of neutral vibratory reaction, and which is pivotally connected on a longitudinal axis at 4, to the center of a downwardly curved transverse cross member or bar 5, secured at its opposite ends to the side members 1—1. The front of the engine is in turn, supported at two points, upon a transverse cross member, located forwardly of the engine. This cross member consists of a bar 6 having a pair of rearwardly extending arms 7, formed either integrally, or as separate angle members riveted or otherwise secured thereto. The ends of the arms are pivotally secured on a transverse axis, to opposite sides of the engine block, as by means of pins or bolts 8 passing through the arms and through forwardly extending integral lugs 9—9 of the engine block. Connections between opposite ends of the bar 6 and side frame members 1—1, are provided in the form of flexible but inextensible plate-like members 10, of sheet metal or the like, which are disposed in a vertical plane so as to support the gravity load of the engine, while permitting of a slight bending or torsional twisting to accommodate movement of the bar 6, when the arms 7 are swung up and down with forced engine vibrations or frame weaving. The leverage or swing of the arms 7, may be varied according to conditions of use and the range or amplitude of the movement to be absorbed, by simply changing the length of the arms, and consequently, the longitudinal spacing between the resilient members 10 and pivotal connections 8.

While the invention has been described more or less specifically it is to be understood that it is not to be limited to exact details shown, but that it is capable of such modifications as come within the scope of the appended claims.

Having described my invention I claim:

1. In a motor vehicle, the combination with a chassis frame and an engine to be supported thereby, of a flexible mounting, including a transverse member extending across the front of the engine, having a pair of spaced rearwardly projecting arms pivoted on a transverse horizontal axis to opposite sides of the engine, and resilient connections between said member and the chassis frame adapted to be flexed to accommodate a swinging movement of said arms about their transverse horizontal axis upon relative movement of the engine in said frame.

2. In a motor vehicle, the combination with a chassis frame and an engine to be supported thereby, of a flexible mounting, including a swinging member interposed between the engine and frame to permit relative movement thereof, means to pivotally inter-connect said member and engine on a transverse horizontal axis and other means to resiliently connect said member and frame and being adapted to yieldingly resist the swinging movement of the member.

3. In a motor vehicle, the combination with a chassis frame and an engine to be supported thereby, of a flexible mounting for the front of the engine, consisting of a cross member having portions adapted for torsional twisting and other portions thereof pivotally connected to the engine on a transverse axis rearwardly of said first mentioned portions.

4. In a motor vehicle, the combination with a chassis frame and an engine to be supported thereby, of a flexible mounting for the front of the engine, consisting of a transverse rigid bar extending across the front of the engine, a pair of spaced rearwardly extending arms fixedly secured to said rigid bar and pivotally connected to opposite sides respectively of the engine on a transverse axis, and flexible connections between opposite ends of the bar and chassis frame.

5. A flexible engine suspension, including in combination, with a chassis frame and engine, of means to pivotally support the rear of the engine at approximately its neutral point of vibratory reaction to permit relative lateral tilting movement of the engine and means to flexibly support the front of the engine to permit a relative vertical up and down movement thereof, said last mentioned means including a member pivoted to the engine on a transverse horizontal axis and a resilient connection between said member and frame.

In testimony whereof I affix my signature.

CHARLES R. SHORT.